United States Patent [19]

Janosi et al.

[11] 4,382,096

[45] May 3, 1983

[54] PROCESS FOR THE PREPARATION OF HIGH QUALITY WHEAT BREAD CAPABLE OF LONG TERM STORAGE

[75] Inventors: István Janosi, Kalocsa; Tihamer Jankovits, Batya; Lajos Kiss, Budapest; Anna Tóth neé Balogh, Kalocsa; Benö Nagy, Janos Hadjinak, both of Budapest, all of Hungary

[73] Assignee: Kolacsai Suto-Es Edesipari Vallalat, Kalocsa, Hungary

[21] Appl. No.: 286,671

[22] Filed: Jul. 24, 1981

Related U.S. Application Data

[63] Continuation-in-part of Ser. No. 226,614, Jan. 21, 1981, abandoned.

[30] Foreign Application Priority Data

Jan. 28, 1980 [HU] Hungary ........................................ 175

[51] Int. Cl.$^3$ ............................................... A21D 2/00
[52] U.S. Cl. ...................................... 426/21; 426/625
[58] Field of Search ....................... 426/18, 19, 21, 62, 426/622, 625, 457

[56] References Cited

U.S. PATENT DOCUMENTS

| 492,969 | 3/1893 | Putnam | 426/622 |
| 958,494 | 5/1910 | Herendeen | 426/457 |
| 1,262,506 | 4/1918 | Johnson | 426/21 |
| 1,272,220 | 7/1918 | Clarke | 426/21 |
| 3,429,712 | 2/1969 | Turner | 426/19 |
| 3,979,523 | 9/1976 | Titcomb | 426/19 |

FOREIGN PATENT DOCUMENTS 170052 8/1974 Hungary ................................ 426/49

Primary Examiner—Raymond N. Jones
Assistant Examiner—Elizabeth A. Hatcher
Attorney, Agent, or Firm—Karl F. Ross; Herbert Dubno

[57] ABSTRACT

A process for producing high quality wheat-flour bread capable of long-term storage in which a wheat meal is homogeneously combined with a maize (corn) flake flour produced by partially digesting the maize flour to increase the water absorption capacity thereof and combining the flour with yeast, water, salt and leavening to form a dough which is portioned and formed into loaves, permitted to rise and baked.

6 Claims, No Drawings

PROCESS FOR THE PREPARATION OF HIGH QUALITY WHEAT BREAD CAPABLE OF LONG TERM STORAGE

CROSS REFERENCE TO RELATED APPLICATION

This application is a continuation in part of our co-pending application Ser. No. 226,614 filed Jan. 21, 1981 now abandoned.

FIELD OF THE INVENTION

Our present invention relates to a process for making bread and, more particularly, to a process for producing a wheat-flour bread of high quality and capable of long term storage.

BACKGROUND OF THE INVENTION

One of the principal disadvantages of wheat bread, i.e. bread in which the flour component consists predominantly of wheat flour or meal, is that the bread (e.g. white bread) has a relatively short shelf life, i.e. can be stored for only a short time after baking because the bread tends to lose moisture rapidly, to dry out and become unstable or unpalatable. As a result, large quantities of bread can be wasted or rendered unfit for human consumption so that other and less advantageous uses must be found for the product.

It is known to increase the moisture retentivity of commonly manufactured wheat breads by adding potato flour to the wheat meal. The potato flour is generally digested potato flakes formed by digesting flesh of the potato and flaking the flour in flaking meal or on flaking rolls.

However, the addition of potato flour to the dough increases the starch content of the bread and this may be disadvantageous. Thus, while the presence of the potato product in the bread increases the moisture retentivity thereof, thereby augmenting the storage life and the duration following baking for which the bread may be consumed, the use of potato flour is frequently disadvantageous.

Mention should also be made of the fact that any attempt to modify a bread composition must operate against the habits and customs of the people for whom the bread is intended and hence a serious change of the texture, appearance or taste of the bread may result in its rejection in spite of the fact that it is both nutritious and stable for long periods. For example, the nourishment habits of people, especially with respect to essential foods or the stable foods of a particular society, are based upon traditions and conventions so that consumers tend to adhere to conventional products and do not readily turn to even more nourishing, palatable and stable products. Thus, where wheat breads are the stable bread product of a society, efforts to substitute other grains in bread moisture have generally failed.

Since the vegetation period of wheat is relatively long, the risks to bread production in a society depend upon wheat as the basic bread flour. Particularly sensitive to crop failure, for example, even a single crop failure of a crop such as wheat with a long growing time, will create significant problems in the bread supply to the populace.

From the foregoing it will be apparent that there are a number of reasons why it would be advantageous to replace at least a part of the wheat-meal requirements for wheat bread production by another substance, which, however, should not significantly alter the texture, appearance, taste and palatability of the bread, but which will at least partly eliminate dependency upon highly sensitive wheat crop and at the same time improve the moisture retentivity and hence the shelf life of a bread.

Numerous attempts have been made to replace wheat flours in a bread by corn flour (maize) or to substitute corn meal for part or all of the wheat flour customarily used. However, corn meal products have the characteristic taste which has been imparted heretofore to the bread and in spite of the fact that corn appears to be most advantageous because of the high grain yield of a corn crop, its excellent food value and ability to use its stalks for fodder, the products did not receive widespread acceptance in those parts of the world heretofore dependent on the wheat breads. Furthermore, the properties of those breads which included corn meal were in many cases disadvantageous relative to the corresponding properties of a wheat bread.

OBJECTS OF THE INVENTION

It is the principal object of the present invention to provide an improved wheat bread which has long shelf life, i.e. retains its palatability, taste and texture for long periods following baking, and which nevertheless requires less wheat flour than earlier wheat breads.

Yet another object of this invention is to provide a wheat bread of high quality whose taste, texture and palatability are similar to those of ordinary wheat breads but which, in addition, has an improved shelf life.

Yet another object of this invention is to provide an improved process for the preparation of high quality wheat bread capable of long term storage and, particularly, a wheat bread which preserves its fresh taste and consistency for long periods following baking.

SUMMARY OF THE INVENTION

We have found, quite surprisingly in view of the history of attempts to use corn or maize meal in breads, that it is possible to replace a part of the wheat flour with a corn product and obtain all of the advantageous results discussed above in the production of wheat bread.

More particularly, we have found that it is possible to prepare a flake flour from corn which contains the corn starch in a digested form and to use this digested corn flake flour as a substitute for wheat flour in breads. This corn flake flour does not impart to the bread as much of the characteristic corn meal taste as would be expected from the proportions used and improves the texture of the bread even after long term storage while affecting only slightly the taste and color as will be described below.

Because the digested corn flake flour has a high food value, it contributes to the nourishing quality of the bread and, at the same time because the starch content is digested, enables the bread to be used for diabetic nourishment as well.

According to the invention, the dough is formed by combining approximately 20 to 35 kg of wheat meal or flour with 1 to 4 kg of the digested corn flake flour and an appropriate quantity of water containing sodium chloride and water-dispersed yeast, leaven being added as well. The leaven, which can be added in an amount of 20 to 40 kg, preferably is previously prepared from wheat flour, yeast, water and leaven seed or initiator (e.g. sour dough).

More specifically, the leaven can be formed by combining about 44 to 46 kg of water containing 1.2 to 1.3 kg of yeast, 63 to 65 kg of wheat meal or flour, preferably of grade 80 (BL 80) and 1.6 kg of the leaven seed such as sour dough from a previous batch. The leaven mixture is thoroughly mixed for 7 to 9 minutes and then permitted to ripen for 6 to 8 hours at a temperature of about 30° to 32° C.

In the foregoing and below, quantities of the various ingredients will be given by weight or volume and it should be understood that similar proportions can be observed regardless of the actual weights or volumes used to make any desired number of loaves of bread.

Leaven, advantageously formed as described above, can be used in an amount of 32 kg for each mixture of approximate corresponding weight of wheat meal and digested corn flake flour.

A particularly suitable mixture of the latter type includes two wheat meal grades, preferably grade BL 80 and grade BL 55, in combination, together with the digested corn flake flour.

In a preferred mode of the invention the leavening, after having ripened at a temperature in excess of 30° C. for a period of more than six hours, is intensively kneaded together with 0.4 to 0.5 kg of yeast dispersed in 3.5 to 5 liters of water, 1.1 to 1.5 kg of sodium chloride dissolved in about 15 liters of water and a homogeneous mixture of 4 to 5.5 kg of wheat flour of grade BL 80, 25 to 29 kg of wheat flour of grade BL 55 and 1.4 to 2.24 kg of the digested corn flake flour. 1.4 to 1.8 grams of ascorbic acid can also be added and the intensively kneaded dough is permitted to rest until after water equalization is effected throughout the mass whereupon the dough is portioned, permitted to rise for 50 to 70 minutes and baked at a temperature of 250° to 280° C. for 25 minutes.

The digested corn flake flour, as has been noted, is a powdery product obtained by subjecting maize to digestion in a manner such that the long starch chains are cracked and hydrolyzed to yield a highly digestible product. More particularly, the corn kernels, after or even without a preliminary milling, are treated with steam, preferably from heated steam at a temperature of about 105° C., for example, for a period sufficient to allow penetration of the corn material by the steam whereupon the steam pressure can be released. The particular pressures and temperatures used have not been found to be critical since the digestion, even for the briefest time, markedly improves the digestibility of the corn product. The starch molecules are thereby broken up and the corn product after digestion, preferably by remaining in contact with the steam for at least 10 minutes, can be milled in an impact mill or with flaking rollers.

According to the invention ripening is carried out at a higher temperature than is conventional, preferably at 30° to 32° C. The duration of ripening is also longer than in the case of conventional commercial bread-baking technology and preferably is between 6 and 8 hours.

The dough is rested for a longer time than usual, but at least until water equalization takes place.

The preferred amount of wheat meal of the grade 80 is 4.6 kg, while wheat meal of the grade 55 preferably is used in an amount of 1.6 kg, when the quantity of the other ingredients is as defined.

The dough preferably is allowed to rise in a bread basket.

The baked product is allowed to cool and is transported to the consumers or to the place of distribution.

EXAMPLE

Leaven is prepared from meal BL 80, yeast, water and leaven initiator (sourdough) in an amount required for three intensive kneadings.

Into a kneader 44 to 46 kg of water containing 1.2 to 1.3 kg of yeast, 63 to 65 kg of wheat meal and 1.6 kg of leaven seed are weighed. The mixture is thoroughly admixed for 7 to 9 minutes. Thereafter the leavened mixture is ripened for about 6 to 8 hours at a temperature of about 30° to 32° C.

32 kg of the ripened leaven are weighed into the container of an intensive kneader, 4 l of water in which 0.4 to 0.5 kg of yeast have previously been dispersed, and subsequently a solution of 1.2 to 1.4 kg of sodium chloride in about 15 l of water are added. To the container a previously homogenized mixture of 4.5 to 5.5 kg of meal BL 80, 26.1 to 27.5 kg of meal BL 55 and 1.4 to 1.6 kg of maize flake flour containing digested starch is weighed. Preferably about 1.6 g of ascorbic acid are also added.

The maize flake flour and the wheat meal should be carefully homogenized in a dry state before addition into the container of intensive kneader. This is essential since while when preparing a so-called "whte bread" (pure wheaten bread) or a bread in which wheat meal is partially replaced by potato, the components are homogenized well during kneading, the maize flake flour due to its hydrophilic character becomes immediately lumpy when it is contacted with water. The bread prepared using such as flour is disagreeable. When previous homogenization is carefully carried out, the flake flour will uniformly be dispersed in the soft part of bread and its water uptake will also be uniform.

The mixture is then kneaded in the intensive kneader for 2 to 3 minutes. The quantity of water required for kneading can vary depending on the water uptake of meal to a small extent, but as a rule the maize flake flour can take up water in an amount equal to its own weight. Therefore more water is required for this technology than for the preparation of conventional wheaten breads.

After kneading the dough is rested for a longer time than usual. The excess time due to the slower water equalization amounts to about 2 to 4 minutes.

The dough is then portioned to about 73 loaves of bread, weighing 1.15 kg each. The loaves are shaped in a manner known per se and are placed into a bread basket.

The bread is allowed to rise for about 50 to 70 minutes, which exceeds the time required for rising conventional white breads by about 15 minutes. This is also due to the increased quantity of water employed.

The breads are then placed on the assembly line of the furnace, their surface is wetted and they are baked at 240° to 260° C. for about 36 to 40 minutes. The temperature is about 20° C. lower than usual and the baking time is by about 10% increased. The changes in the parameters are due to the fact that the crust of the breads containing maize flake is formed in a shorter time and its structure is tighter, therefore the water release is somewhat slowed down.

The golden yellow breads are taken out of the furnace and are allowed to cool.

The breads prepared by the process according to the invention have a soft inner part, a large specific volume, a loose structure and a very pleasant aroma. The presence of maize flake flour increases the water absorbing capacity of the bread and since the crust of the bread has a tight structure, the bread preserves its freshness for a long time. Since the drying out is slowed down, the breads prepared in this way are consumable even after 72-hour storage at room temperature. A further advantage is that the breads obtained are more easily digestible and introduce proteins into the organism, which has physiological importance.

We claim:

1. A process for producing a high quality wheat bread with a long shelf-life, comprising the steps of:
   (a) preparing a bread leaven by combining wheat flour, yeast, water and a leavening initiator and ripening said leaven at a temperature of 30°-32° C. for 6 to 8 hours;
   (b) homogenizing a dry flour mixture of wheat flour and digested cornflake flour to form a homogeneous flake mixture, said digested corn flake flour prepared by subjecting corn kernels to a treatment with steam at 105° C. for at least 10 minutes to allow penetration of the corn kernels by the steam to cause breakdown of the starch molecules in the corn kernels, followed by milling said product;
   (c) contacting said dry flour mixture homogenized in step (b) with an effective amount of the bread leaven formed in step (a), a yeast, water and salt to form a bread dough, said dough being formed by combining said leaven, the components of said flour mixture, said yeast, said salt and water in proportions such that said dough contains about 32 kg of the ripened leaven for 0.4 to 0.5 kg of yeast dispersed in 3.5 to 5 liters of water, 1.1 to 1.5 kg of salt in about 15 liters of water, 4 to 5.5 kg of wheat flour of grade BL 80, 25 to 29 kg of wheat flour of grade BL 55 and 1.5 to 2.24 kg of digested corn flakeflour;
   (d) kneading the dough;
   (e) resting said kneaded dough to permit water equalization therein;
   (f) portioning said dough;
   (g) allowing the portioned dough to rise for a period of 50 to 70 minutes; and
   (h) baking the portioned dough for a period of about 35 minutes at a temperature of about 250° C.-280° C.

2. The process defined in claim 1 wherein said dough further comprises 1.4 to 1.8 grams of ascorbic acid for each 32 kg. of the ripened leaven.

3. The process defined in claim 1 wherein, in step (c) the yeast is added to the dough in about 4 liters of water for each 32 kg. of the leaven.

4. The process defined in claim 3 wherein the salt is added in step (c) in amount of 1.3 kg. of sodium chloride for each 32 kg. of the ripened leaven.

5. The process defined in claim 4 wherein said flour mixture for each 32 kg. of the ripened leaven consists of about 4.6 kg. of grade 80 wheat flour, 26.6 kg. of grade 55 wheat flour and 1.6 kg. of the digested corn flake flour.

6. The process defined in claim 5 wherein the dough portions are permitted to rise in step (g) in bread baskets.

* * * * *